(12) United States Patent
Danner et al.

(10) Patent No.: US 11,680,694 B2
(45) Date of Patent: Jun. 20, 2023

(54) GROUND PROJECTION DEVICE FOR A MOTOR VEHICLE

(71) Applicant: ZKW Group GmbH, Wieselburg (AT)

(72) Inventors: Markus Danner, Ollersdorf (AT); Christian Maier, Oberndorf an der Melk (AT)

(73) Assignee: ZKW Group GmbH, Wieselburg (AT)

( * ) Notice: Subject to any disclaimer, the term of this patent is extended or adjusted under 35 U.S.C. 154(b) by 0 days.

(21) Appl. No.: 17/601,315

(22) PCT Filed: Mar. 10, 2020

(86) PCT No.: PCT/EP2020/056319
§ 371 (c)(1),
(2) Date: Oct. 4, 2021

(87) PCT Pub. No.: WO2020/216519
PCT Pub. Date: Oct. 29, 2020

(65) Prior Publication Data
US 2022/0196222 A1 Jun. 23, 2022

(30) Foreign Application Priority Data
Apr. 24, 2019 (EP) ..................................... 19170802

(51) Int. Cl.
*F21S 43/20* (2018.01)
*B60Q 1/24* (2006.01)
(Continued)

(52) U.S. Cl.
CPC ................ *F21S 43/26* (2018.01); *B60Q 1/24* (2013.01); *B60R 1/1207* (2013.01);
(Continued)

(58) Field of Classification Search
CPC ...... B60R 1/1207; B60Q 1/2665; B60Q 1/50; B60Q 1/503; B60Q 2400/40; B60Q 2400/50; F21W 2103/60
See application file for complete search history.

(56) References Cited

U.S. PATENT DOCUMENTS 10,928,029 B1 * 2/2021 Woo .......................... F21S 43/26
10,960,813 B2 * 3/2021 Imaishi ..................... B60Q 1/24
(Continued)

FOREIGN PATENT DOCUMENTS

JP 2016107776 A 6/2016

OTHER PUBLICATIONS

International Search Report for PCT/EP2020/056319, dated May 18, 2020 (10 pages).
(Continued)

*Primary Examiner* — Colin J Cattanach
(74) *Attorney, Agent, or Firm* — Eversheds Sutherland (US) LLP

(57) ABSTRACT

Floor projection device for a motor vehicle for producing at least one floor projection, wherein the floor projection device has an illuminant and a projection means, wherein the illuminant is configured to generate and at least partially emit light onto the projection means, wherein the projection means is configured to project the light which is emitted by the illuminant onto the projection means, in a state of the floor projection device integrated into the motor vehicle, onto a carriageway as a floor projection to the side of the motor vehicle, wherein the floor projection comprises at least two light segments separated from one another, wherein the illuminant has for this purpose at least two individually controllable light sources, wherein each light segment is assigned at least one light source, wherein the projection means has a focal point or a focal line, wherein (Continued)

at least one of the at least two light sources is arranged offset relative to the focal point or focal line of the projection means, wherein a first portion of the light is emitted along a first beam direction, which is directed directly onto the projection means, wherein a second portion of the light is emitted in a second beam direction, which is not directed directly onto the projection means, wherein the floor projection device has absorption means and/or deflection means, which are configured to at least partially absorb and/or deflect the second portion of the light such that the second portion of the light does not reach the projection means.

17 Claims, 3 Drawing Sheets

(51) Int. Cl.
  *B60R 1/12* (2006.01)
  *F21W 103/60* (2018.01)
  *B60Q 1/26* (2006.01)
  *B60Q 1/50* (2006.01)

(52) U.S. Cl.
  CPC .............. *B60Q 1/2665* (2013.01); *B60Q 1/50* (2013.01); *B60Q 1/503* (2013.01); *B60Q 2400/40* (2013.01); *B60Q 2400/50* (2013.01); *F21W 2103/60* (2018.01)

(56) References Cited

U.S. PATENT DOCUMENTS

| | | | |
|---|---|---|---|
| 2005/0117364 A1* | 6/2005 | Rennick | B60Q 9/008 362/540 |
| 2007/0053195 A1* | 3/2007 | Alberti | B60Q 1/2665 362/494 |
| 2017/0210282 A1 | 7/2017 | Rodriguez Barros | |
| 2018/0229648 A1* | 8/2018 | Meier | F21S 43/145 |
| 2019/0078373 A1* | 3/2019 | Schulz | E05F 15/40 |
| 2019/0106050 A1* | 4/2019 | Kamhi | G06V 20/58 |
| 2019/0322209 A1* | 10/2019 | Sugiyama | B60Q 1/38 |

OTHER PUBLICATIONS

Search Report for European Patent Application No. 19170802.3 dated Oct. 10, 2019 (7 pages).

* cited by examiner

GROUND PROJECTION DEVICE FOR A MOTOR VEHICLE

The invention relates to a floor projection device for a motor vehicle for producing at least one floor projection, wherein the floor projection device has an illuminant and a projection means, preferably at least one projection lens, wherein the illuminant is configured to generate and at least partially emit light onto the projection means, wherein the projection means is configured to project the light which is emitted by the illuminant onto the projection means, in a state of the floor projection device integrated into the motor vehicle, onto a carriageway as a floor projection to the side of the motor vehicle, wherein the floor projection comprises at least two light segments separated from one another, wherein the illuminant has for this purpose at least two individually controllable light sources, wherein each light segment is assigned at least one light source, wherein the projection means has a focal point or a focal line, wherein at least one of the at least two light sources is arranged offset relative to the focal point or focal line of the projection means, wherein a first portion of the light, which is generated by the at least two light sources, is emitted along a first beam direction, which is directed directly onto the projection means, wherein a second portion of the light, which is generated by at least one of the at least two light sources, is emitted in a second beam direction, which is not directed directly onto the projection means.

The invention moreover relates to a motor vehicle comprising a floor projection device.

Devices for emitting light to the side of a motor vehicle are known in the prior art. However, devices that can emit several light segments onto a carriageway have the disadvantage that the individual light segments may have an inadequate contrast when they are emitted onto a carriageway due to stray light from the light sources, which results in a deterioration of the signal effect.

The object of the present invention therefore consists in mitigating or eliminating the disadvantages of the prior art. The objective of the invention is therefore in particular to create a floor projection device for a motor vehicle where the projection of light segments onto a carriageway is improved.

This object is achieved by a floor projection device having the features of Claim 1. Advantageous embodiments are specified in the dependent claims.

According to the invention, the floor projection device has absorption means and/or deflection means, which are configured to at least partially absorb and/or deflect the second portion of the light which is emitted along the second beam direction such that the second portion of the light does not reach the projection means. The second portion of the light can substantially be understood as stray light which can be caused by the fact that at least one light source is not arranged directly in the focal point or focal line of the projection means. If stray light hits the projection means, the contrast of the light segments projected onto the carriageway is disadvantageously reduced. Thanks to the absorption means and/or deflection means according to the invention, the projection means can remain substantially free of stray light. Preferably, the stray light within the floor projection device, more precisely in the spatial area between the illuminant and the projection means, cannot penetrate as far as the projection means, as the stray light is preferably substantially completely absorbed and/or deflected on the way from the illuminant to the projection means. This enhances the contrast of the light segments and thus increases their visibility. This in turn enhances road safety.

The at least two light segments of the floor projection are projected to the side of the motor vehicle onto a carriageway, wherein to the side in this context should be understood as to the side in the direction of travel of the motor vehicle. In other words, in the direction of travel the left and/or right side of the motor vehicle. Those sides of the vehicle to which, for example, the wing mirrors of the motor vehicle are attached.

The at least two light segments can be essentially strip-shaped. In this case, the at least two light segments can have a similar or different length, for instance. In other words, a light segment in the state projected onto a carriageway can, for example, be considered as a light strip or luminous strip which lights up or illuminates a strip-shaped area of a carriageway. A light segment has in particular a longitudinal extent and a transverse extent, wherein the longitudinal extent is greater than the transverse extent, as a result of which a strip-shaped illuminated area can be produced on a carriageway. The longitudinal extent of the light segment runs, in the state projected onto a carriageway, preferably parallel to the longitudinal axis of the motor vehicle. The transverse extent of the light segment runs, in the state projected onto a carriageway, preferably orthogonal to the longitudinal axis of the motor vehicle.

The offset of the at least one of the at least two light sources in the installed state of the floor projection device is preferably formed in a vertical direction. In other words, one of the at least two light sources can be arranged vertically above or below the other light source. The light sources can be directly connected to one another or have a distance from one another.

The illuminant preferably comprises a plurality of light sources, which are arranged on a circuit board in light source rows vertically one above the other, wherein preferably the individual light source rows respectively have a different number of light sources that are arranged horizontally next to one another. Thus, for example, a first light source row may have n light sources and a second light source row, which is arranged vertically above or below the first light source row, may have n+1 or n−1 light sources, for instance. If the second light source row has n+1 light sources, the first light source row can have n light sources with n>0. If the second light source row has n−1 light sources, the first light source row can have n light sources with n>1, wherein n is a natural number. The second light source row can also have n+m light sources, wherein m is a natural number. An LED is provided, in particular, as a light source.

It can be advantageous if the number of light source rows corresponds to the number of light segments projected onto the carriageway.

Each light source row is preferably respectively assigned a light segment. In particular, each light source row can be assigned precisely one light segment. As such, the light that is generated from the light sources of a first light source row is preferably provided for a first light segment. Furthermore, the light that is generated from the light sources of a second light source row is preferably provided for a second light segment.

The at least two light sources and the projection means can be configured and arranged in such a way that at least two light segments can be projected onto the carriageway without overlapping. As such, the at least two light segments are preferably spaced apart from one another. In other words, there is an area that is not lit up between two light segments, in the state projected onto a carriageway. The distance between two light segments can, for example, correspond to a width of a light segment.

The at least two light sources and the projection means are preferably configured and arranged in such a way that the at least two light segments can be respectively projected onto the carriageway at a different distance relative to the motor vehicle. For example, a first light segment, the light of which is provided by the light sources of a first light source row, can be projected by the projection means at a first distance onto the carriageway, wherein the first light segment has a first length and a first width. Furthermore, a second light segment, the light of which is provided by the light sources of a second light source row, can, for example, be projected by the projection means at a second distance onto the carriageway, wherein the second light segment has a second length and a second width. The first and second distances, the first and second lengths and the first and second widths can be similar or different. In other words, at least two light segments, which have different dimensions relative to one another or illuminate areas or regions of a carriageway of different sizes, can be projected onto a carriageway by the projection means at different distances from the motor vehicle, for example. For example, a first light segment, which is shorter and/or narrower relative to a second light segment, can be projected onto a carriageway at a smaller distance from the motor vehicle compared to the second light segment. A first light segment can be projected onto the carriageway, for example, at a lateral distance of 0-1 m from the motor vehicle, a second light segment at a lateral distance of 1-2 m from the motor vehicle and a third light segment at a lateral distance of 2-3 m from the motor vehicle, wherein the individual light segments in particular do not overlap.

The floor projection device preferably has a housing at least partially enclosing the at least two light sources and the projection means, wherein preferably at least one inner surface of the housing has the absorption means and/or deflection means. The at least one inner surface of the housing, which can have the absorption means and/or deflection means, is preferably an inner surface that extends between the illuminant and the projection device. In an advantageous manner, the second portion of the light, which is emitted along the second beam direction, can thus be absorbed and/or deflected such that the second portion of the light does not reach the projection means. The absorption means can comprise light-absorbing elements, which, for example, are attached to at least one inner surface of the housing. The deflection means can comprise refractive or light-scattering elements on the at least one inner surface of the housing. Deflection means can, for example, comprise groove-shaped, serrated or pyramid-shaped structures which refract the second portion of the light such that the second portion of the light does not reach the projection means. The deflection means can additionally be produced from a light-absorbing material. This corresponds to a combination of deflection means and absorption means.

The housing can in particular enclose an edge area of the projection means in a form-fitting manner, wherein preferably the absorption means and/or the deflection means are arranged within the housing up to immediately in front of the projection means. In other words, the absorption means and/or deflection means extend within the housing on at least inner surface of the housing up to immediately adjacent to the projection device. This has the advantage that the second portion of the light, the stray light, is not emitted past the projection means and thus outside of the housing. The stray light can thus be substantially completely absorbed and/or deflected, or a sufficient amount of stray light can be absorbed and/or deflected such that there can be no significant deterioration in the contrast of the light segments projected onto a carriageway.

The floor projection device preferably has a communication means for detecting a direction indicator signal, and is configured to enable the activation of the emitting of the light segments synchronously with the activation of a direction indicator of the motor vehicle. The projection of the at least two light segments can occur substantially simultaneously with the light signal of the direction indicator. A turning manoeuvre or a change of lane performed by the motor vehicle can thus advantageously be seen better by other road users.

The projection means of the floor projection device preferably comprises precisely one single projection lens, in particular a free-form lens, wherein the first portion of the light of all light sources generating the light segments is directed onto this single projection lens. The weight and costs of the floor projection device can be reduced thanks to the preferred use of a single free-form lens. The free-form lens is formed in such a way that the light that is emitted from respectively one of the at least two light source rows in the first beam direction is projected onto a carriageway in the form of a light segment assigned to the corresponding light source row.

According to the invention, a motor vehicle comprising a floor projection device is provided.

The floor projection device is preferably attached to at least one wing mirror of the motor vehicle.

The floor projection device can in particular comprise a cooling device, which is preferably in thermal contact with the illuminant and is configured to dissipate heat from the illuminant. The cooling device can, for example, be arranged within, outside or at least partially outside the housing. Furthermore, the floor projection device can comprise an attachment device, with which the floor projection device can be attached to a motor vehicle, for example to a wing mirror of the motor vehicle. The attachment device can have electronic components, which are configured to supply the floor projection device with energy when the floor projection device is attached to a motor vehicle.

In the context of this description, the terms "above", "below", "horizontal", "vertical" should be understood as indications of orientation when the floor projection device is arranged in its normal position of use after having been fitted to a wing mirror of a motor vehicle, for instance.

The invention is outlined in more detail below based on a preferred exemplary embodiment, to which it is, however, not limited: In the drawing, FIG. 1 shows a front view of a floor projection device according to the invention;

The figures show schematic views, wherein insignificant components are omitted in each case. This should aid understanding.

Figure 1:
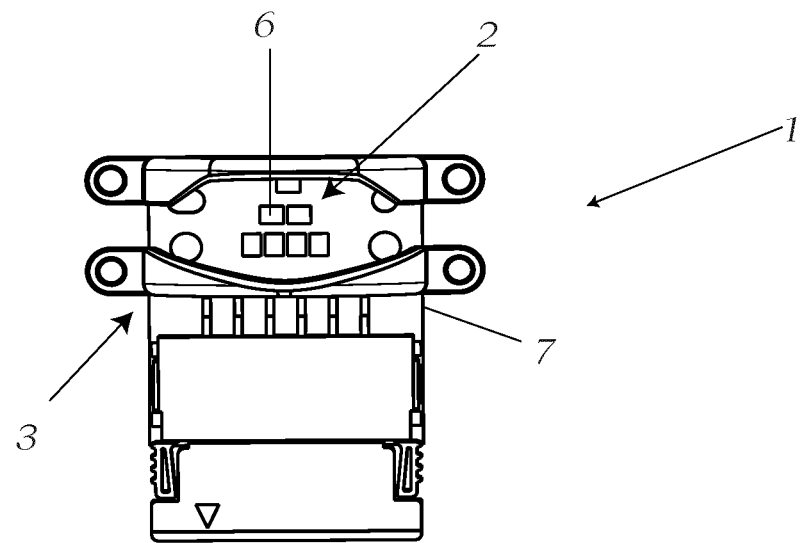

FIG. 1 shows a floor projection device 1 for a motor vehicle for producing at least one floor projection. The floor projection device 1 comprises an illuminant 2 and a projection means 3, preferably at least one projection lens 4, wherein the illuminant 2 is configured to generate and at least partially emit light onto the projection means 3. The projection means 3 is configured to project the light which is emitted by the illuminant 2 onto the projection means 3, in a state of the floor projection device 1 integrated into the motor vehicle, onto a carriageway as a floor projection to the side of the motor vehicle (see FIG. 5). In the exemplary embodiment shown, the projection means 3 comprises precisely one single projection lens 4, in particular a free-form lens. The floor projection comprises at least two light segments 5 separated from one another. In the exemplary embodiment according to FIG. 5, the floor projection respectively comprises three light segments 5, which are projected onto a carriageway on the left and right vehicle side. In order to produce the floor projection, the illuminant 2 has at least two individually controllable light sources 6, wherein each light segment 5 is assigned at least one light source 6. The projection means 3 has a focal point or a focal line, wherein at least one of the light sources 6 is arranged offset relative to the focal point or focal line of the projection means 3. According to the exemplary embodiment in FIG. 1, the illuminant 2 comprises seven light sources 6, which are arranged on a circuit board 7 in light source rows vertically one above the other. A first light source row comprises four light sources 6, a second light source row arranged vertically above it comprises two light sources 6 and a third light source row arranged vertically above the second light source row comprises one light source 6. The number of light source rows corresponds to the number of light segments 5 projected onto the carriageway on one vehicle side, wherein each light source row is respectively assigned a light segment 5. The light sources 6 and projection means 3 are configured and arranged in such a way that the individual light segments 5 are projected onto the carriageway without overlapping.

Figure 2:
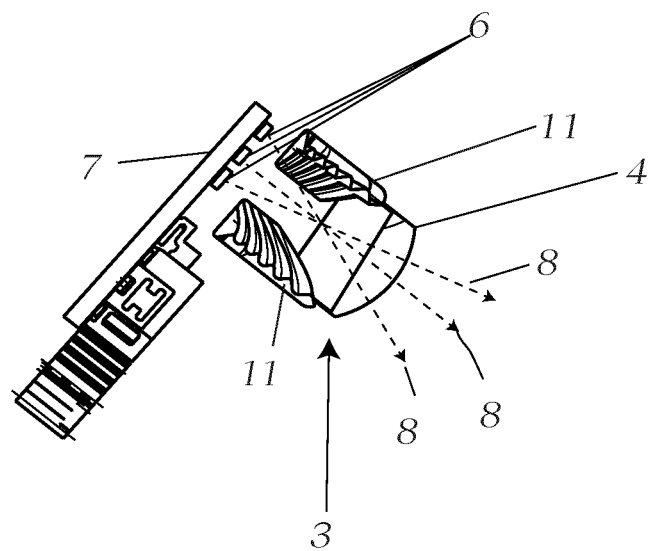
FIG. 2 shows a side view of the floor projection device.

As can be seen in FIG. 2, a first portion of the light, which is generated by the light sources 6, is emitted along a first beam direction 8, which is directed directly onto the projection means 3. The first portion of the light is composed of the light that is produced by the various light source rows. In this case, each light source row produces the light for a specific light segment 5.

Figure 3:
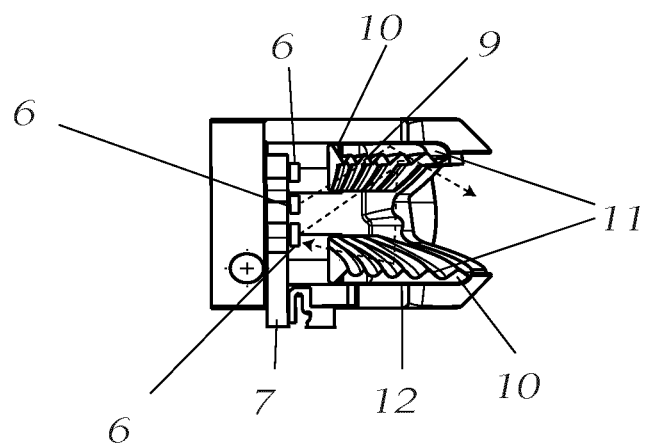
FIG. 3 shows a further side view of the floor projection device.

As can be seen in FIG. 3, a second portion of the light, which is generated by the light sources 6, is emitted in a second beam direction 9, which is not directed directly onto the projection means. The second portion of the light, the stray light, comes from the fact that some light sources 6 or some light source rows are arranged outside the focal point or outside the focal line of the projection means 3. This stray light can then be reflected off inner surfaces 10 of the floor projection device 1 and thereby reach the projection means 3. This leads to a deterioration of the contrast of the light segments 5 projected onto the carriageway.

Figure 4:
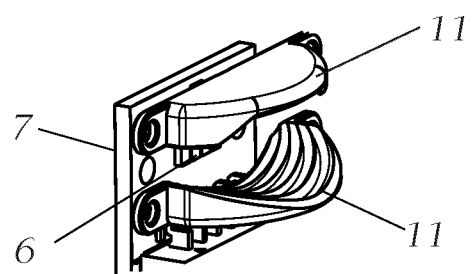
FIG. 4 shows a perspective view of absorption means or deflection means of the floor projection device.

The floor projection device 1 has absorption means and/or deflection means 11, which are configured to at least partially absorb and/or deflect the second portion of the light, the stray light, which is emitted along the second beam direction 9 such that the second portion of the light does not reach the projection means 3. FIG. 4 shows the absorption means and/or deflection means 11 of the floor projection device 1, wherein numerous components of the floor projection device 1 are not shown for a simplified illustration. The absorption means and/or deflection means 11 have a groove-shaped structure, serrated in cross-section, as a result of which light is deflected or refracted such that the light can no longer reach the projection means 3. The absorption means and/or deflection means 11 can further be produced from a light-absorbing material.

Figure 5:
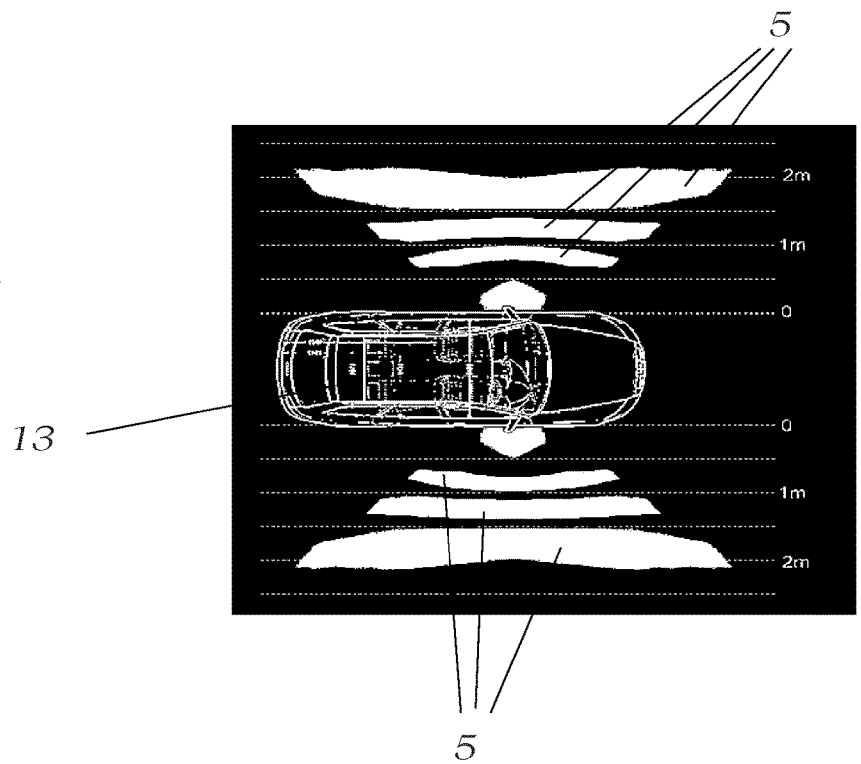
FIG. 5 shows a plan view of a motor vehicle with light segments projected at the side.

FIG. 5 shows the light segments 5 projected onto a carriageway with the floor projection device 1, which light segments 5 are essentially strip-shaped. The light segments 5 are respectively projected onto the carriageway at a different distance relative to the motor vehicle.

Figure 6:
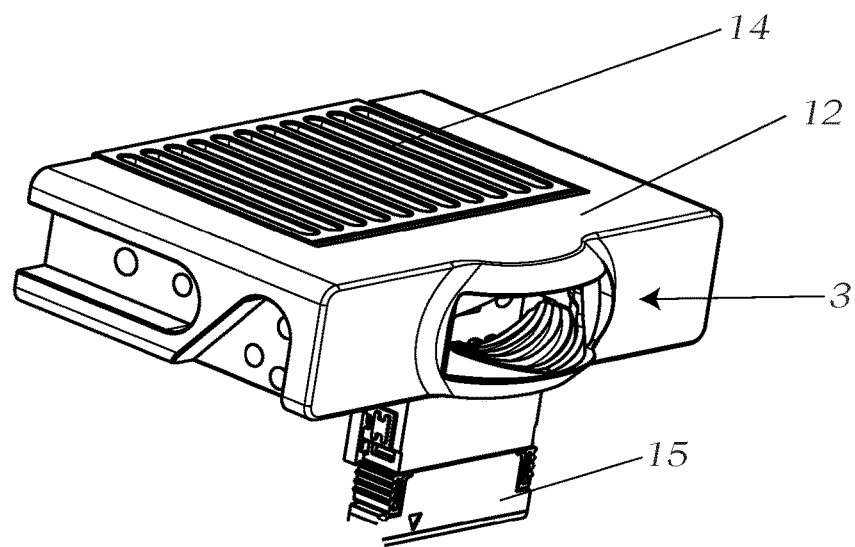
FIG. 6 shows a perspective view of a floor projection device having a housing and an attachment device.

As FIGS. 3 and 6 illustrate, the floor projection device 1 has a housing 12 at least partially enclosing the light sources 6 and the projection means 3, wherein at least one inner surface 10 of the housing 12 has the absorption means and/or deflection means 11. In the exemplary embodiment shown, the absorption or deflection means 11 are respectively attached to an upper and a lower inner surface 10 of the housing 12. The housing 12 encloses an edge area of the projection means 3 in a form-fitting manner, wherein the absorption means and/or the deflection means 11 are arranged within the housing 12 up to immediately in front of the projection means 3. In FIG. 6, an attachment device 15 is further shown, with which the floor projection device 1 can be attached to a motor vehicle 13, for example to a wing mirror of the motor vehicle 13.

The floor projection device 1 comprises a communication means (not shown) for detecting a direction indicator signal, and is further configured to enable the activation of the emitting of the light segments 5 synchronously with the activation of a direction indicator of the motor vehicle. In this case, several light sources 6 can be activated simultaneously with the direction indicator, wherein corresponding light segments 5 are projected onto the carriageway by means of the projection device 3. The light sources 6 can, however, also be activated at different times, for example alternately or consecutively, such that light segments 5 can be projected onto the carriageway in the form of different light signals or luminous patterns by means of the projection means 3.

As shown in FIG. 6, the floor projection device comprises in particular a cooling device 14, which is preferably in thermal contact with the illuminant 2 and is configured to dissipate heat from the illuminant 2. The cooling device 14 can, for example, be arranged within, outside or at least partially outside the housing 12. Furthermore, the floor projection device 1 can comprise an attachment device 15, with which the floor projection device 1 can be attached to a motor vehicle, for example to a wing mirror of the motor vehicle. The attachment device 15 can have electronic components, which are configured to supply the floor projection device 1 with energy when the floor projection device 1 is attached to a motor vehicle.

The invention claimed is:

1. A floor projection device (1) for a motor vehicle for producing at least one floor projection, the floor projection device (1) comprising:
    an illuminant (2); and
    a projection means (3),
    wherein the illuminant (2) is configured to generate and at least partially emit light onto the projection means (3), wherein the projection means (3) is configured to project the light which is emitted by the illuminant (2) onto the projection means (3), in a state of the floor projection device (1) integrated into the motor vehicle, onto a carriageway as a floor projection to the side of the motor vehicle, wherein the floor projection comprises at least two light segments (5) separated from one another, wherein the illuminant (2) has for this purpose at least two individually controllable light sources (6), wherein each light segment (5) is assigned at least one light source (6), wherein the projection means (3) has a focal point or a focal line, wherein at least one of the at least two light sources (6) is arranged offset relative to the focal point or focal line of the projection means (3), wherein a first portion of the light, which is generated by the at least two light sources (6), is emitted along a first beam direction (8), which is directed directly onto the projection means (3), wherein a second portion of the light, which is generated by at least one of the at least two light sources (6), is emitted in a second beam direction (9), which is not directed directly onto the projection means (3), wherein the second portion of the light is a stray light generated by at least one of the at least two light sources, wherein the floor projection device (1) has absorption means and/or deflection means (11), which are configured to at least partially absorb and/or deflect the second portion of the light which is emitted along the second beam direction (9) such that the second portion of the light does not reach the projection means (3), wherein the absorption means and/or deflection means absorb and/or deflect stray light traveling from the illuminant toward the projection means substantially completely, such that the stray light within the floor projection device cannot penetrate as far as the projection means and wherein the absorption means and/or deflection means have a groove-shaped structure, serrated in cross-section.

2. The floor projection device (1) according to claim 1, wherein the at least two light segments (5) are essentially strip-shaped.

3. The floor projection device (1) according to claim 1, wherein the offset of the at least one of the at least two light sources (6) in the installed state of the floor projection device (1) is formed in a vertical direction.

4. The floor projection device (1) according to claim 1, wherein the illuminant (2) comprises a plurality of light sources (6), which are arranged on a circuit board (7) in light source rows vertically one above the other.

5. The floor projection device (1) according to claim 4, wherein the number of light source rows corresponds to the number of light segments (5) projected onto the carriageway.

6. The floor projection device (1) according to claim 5, wherein each light source row is respectively assigned a light segment (5).

7. The floor projection device (1) according to claim 1, wherein the at least two light sources (6) and the projection means (3) are configured and arranged in such a way that at least two light segments (5) can be projected onto the carriageway without overlapping.

8. The floor projection device (1) according to claim 1, wherein the at least two light sources (6) and the projection means (3) are configured and arranged in such a way that the at least two light segments (5) can be respectively projected onto the carriageway at a different distance relative to the motor vehicle.

9. The floor projection device (1) according to claim 1, wherein the floor projection device (1) has a housing (12) at least partially enclosing the at least two light sources (6) and the projection means (3), wherein at least one inner surface (10) of the housing (12) has the absorption means and/or deflection means (11).

10. The floor projection device (1) according to claim 9, wherein the housing (12) encloses an edge area of the projection means (3) in a form-fitting manner, wherein the absorption means and/or the deflection means (11) are arranged within the housing (12) up to immediately in front of the projection means (3).

11. The floor projection device (1) according to claim 1, which is configured to enable the activation of the emitting of the light segments (5) synchronously with the activation of a direction indicator of the motor vehicle.

12. The floor projection device (1) according to claim 1, wherein the projection means (3) of the floor projection device (1) comprises precisely one single projection lens (4), wherein the first portion of the light of all light sources generating the light segments (5) is directed onto this single projection lens (4).

13. A motor vehicle, comprising a floor projection device (1) according to claim 1.

14. A motor vehicle according to claim 13, wherein the floor projection device (1) is attached to at least one wing mirror of the motor vehicle.

15. The floor projection device (1) according to claim 1, wherein the projection means (3) is at least one projection lens (4).

16. The floor projection device (1) according to claim 4, wherein the individual light source rows respectively have a different number of light sources (6) that are arranged horizontally next to one another.

17. The floor projection device (1) according to claim 12, wherein the one single projection lens (4) is a free-form lens.

* * * * *